(12) United States Patent
Ito et al.

(10) Patent No.: US 6,644,700 B2
(45) Date of Patent: Nov. 11, 2003

(54) BUMPER SPOILER IN A DEVICE FOR REDUCING AIR RESISTANCE OF VEHICLE

(75) Inventors: Hiroyuki Ito, Obu (JP); Kengo Hara, Obu (JP); Hideki Minami, Wako (JP)

(73) Assignees: Honda Giken Kogyo Kabushiki Kaisha, Tokyo (JP); Tokai Kogyo Co., Ltd., Obu (JP)

(*) Notice: Subject to any disclaimer, the term of this patent is extended or adjusted under 35 U.S.C. 154(b) by 0 days.

(21) Appl. No.: 10/269,486

(22) Filed: Oct. 11, 2002

(65) Prior Publication Data

US 2003/0107224 A1 Jun. 12, 2003

(30) Foreign Application Priority Data

Oct. 12, 2001 (JP) ........................................ 2001-315234

(51) Int. Cl.$^7$ ........................... B60R 19/48; B62D 35/00
(52) U.S. Cl. ...................... 293/117; 293/34; 296/180.1; 180/903
(58) Field of Search ........................... 293/117, 34, 123, 293/120, 121; 296/180.1, 180.2, 180.4; 180/903

(56) References Cited

U.S. PATENT DOCUMENTS

| | | | |
|---|---|---|---|
| 4,652,036 A | * | 3/1987 | Okamoto et al. ............ 293/120 |
| 5,580,109 A | * | 12/1996 | Birka et al. ................. 293/120 |
| 6,322,115 B1 | * | 11/2001 | Devilliers .................... 293/120 |

FOREIGN PATENT DOCUMENTS

DE 4300114 * 7/1993 .............. 296/180.1

* cited by examiner

Primary Examiner—Stephen T. Gordan
Assistant Examiner—H. Gutman
(74) Attorney, Agent, or Firm—Merchant & Gould P.C.

(57) ABSTRACT

A device for reducing air resistance of a vehicle includes a front bumper, a bumper spoiler, and a mounting piece. The bumper spoiler includes a main body section and a mounting base section which protrudes from a reverse side of the main body section. The mounting base section is made of rigid material capable of being elastically deformed and harder than the main body section. The main body section and the mounting base section are integrally joined to each other. The mounting base section has a first mounting section and a second mounting section. The first mounting section is inserted into and elastically engaged with a first mounting hole of the bumper, thereby being temporarily fixed to the bumper. The second mounting section is inserted into the second mounting hole of the bumper to be finally fixed to the bumper by the mounting piece.

23 Claims, 9 Drawing Sheets

BUMPER SPOILER IN A DEVICE FOR REDUCING AIR RESISTANCE OF VEHICLE

BACKGROUND OF THE INVENTION

1. Field of the Invention

The present invention relates to a bumper spoiler which is mounted on a front bumper of a vehicle and a device for reducing air resistance of a vehicle which enhances fuel consumption (e.g. miles per gallon) of the vehicle.

2. Background Art

A conventional bumper spoiler, which will be abbreviated as "spoiler" in this specification hereinafter, is known, which is composed in such a manner that, for example, a belt-shaped spoiler is formed out of hard ABS resin by means of injection molding, and the thus molded spoiler is mounted on a lower end portion of a front bumper, which will be abbreviated as "bumper" in this specification hereinafter, with screws. Another conventional spoiler is composed as follows. On a reverse side of an upper end portion of a spoiler body section made of elastic rubber, amounting section having an embedded core bar and having a substantial U-shaped cross section is integrally provided. An elastic contact shield piece is integrally arranged on a front side of the upper end portion. This spoiler body is formed by means of extrusion into a long piece and is cut off by a predetermined length. Thus obtained spoiler body is mounted on a bumper via the mounting section so that the elastic contact shield piece can be elastically contacted with a lower surface of the bumper being directed in a forward direction of the vehicle.

In the case of the former bumper spoiler and the mounting structure thereof, since the bumper spoiler is attached to a portion relatively close to a road face and formed out of hard material, the spoiler tends to be damaged when the spoiler comes into contact with the road face or an obstacle on the road face while the vehicle is traveling.

On the other hand, in the case of the latter bumper spoiler and the mounting structure thereof, performance of mounting the spoiler on the bumper cannot be stabilized. Therefore, while the vehicle is traveling, the spoiler may be shifted from its predetermined position by vibration and air resistance acted to the spoiler.

SUMMARY OF THE INVENTION

It is an object of the present invention to propose a bumper spoiler in a device for reducing air resistance of the vehicle which has satisfactory mounting performance on the front bumper and has a characteristic to prevent damage even when a portion of the spoiler comes into contact with a road face.

The bumper spoiler and the device for reducing air resistance of a vehicle of the present invention include the following aspects in order to resolve the above-described problems.

A device for reducing air resistance of a vehicle of an aspect of the present invention comprises: a front bumper of the vehicle having a first mounting hole and second mounting hole; a bumper spoiler to be mounted on the bumper; and a mounting piece for fixing the bumper spoiler to the front bumper; wherein the bumper spoiler comprises a main body section and a mounting base section, the mounting base section protruding from a reverse side of the main body section; the main body section is made of elastic material; the mounting base section is made of rigid material harder than the main body section, the rigid material capable of being elastically deformed; the main body section and the mounting base section are integrally joined to each other; the mounting base section has a first mounting section and a second mounting section; the first mounting section is inserted into and elastically engaged with the first mounting hole, thereby being temporarily fixed to the bumper; and the second mounting section is inserted into the second mounting hole so that the second mounting section is finally fixed to the bumper by means of the mounting piece.

According to this aspect of the invention, while the first mounting section for temporarily fixing the spoiler is inserted into and elastically engaged in the first mounting hole so that the spoiler can be temporarily fixed, the spoiler can be finally fixed to the bumper by using the mounting piece. Therefore, the spoiler can be firmly fixed to the bumper. Accordingly, the spoiler cannot be shifted from a predetermined position by air resistance and vibration given to the spoiler while the vehicle is traveling. When the spoiler is used being mounted on the bumper of the vehicle, a wind colliding against the bumper from the forward portion is effectively made to flow to a rear portion, so that air resistance can be reduced while the vehicle is traveling. Accordingly, fuel consumption miles per gallon can be enhanced. Further, since the main body section of the spoiler is made of soft elastic material, it is not damaged even when a portion of the spoiler comes into contact with a road face.

According to another aspect of the invention, the front bumper has a mounting groove; and the mounting base section has a common mounting section continuously formed along the main body section, the common mounting section to be engaged with the mounting groove.

Since the common mounting section of the spoiler can be engaged in the mounting groove of the bumper all over the length, the spoiler can be stably mounted on the bumper.

According to another aspect of the invention, the first and the second mounting section are formed as residual portions which are left when a distal edge of the mounting base section are partially removed.

In this aspect of the invention, due to the existence of the common mounting section, there is no possibility that a slender portion of the mounting base section between the first and the second mounting section is unexpectedly bent. Accordingly, the long spoiler can be kept in a profile of a straight line, and the spoiler can be easily handled in the process of manufacturing and transporting, and further the spoiler can be easily mounted on the bumper.

According to another aspect of the invention, the first mounting section includes a pair of elastic pieces both mutually separated and capable of elastically deforming; each elastic piece has a tip end portion, intermediate portion and root portion; a distance between the intermediate portions of the pair of elastic pieces exceeds the size of the first mounting hole before the pair of elastic pieces are inserted into the first mounting hole; and a width of the root portion of the first mounting section is smaller than the size of the first mounting hole.

In this aspect of the invention, only when the first mounting section of the mounting base section of the spoiler is inserted into the first mounting hole of the bumper, the spoiler can be engaged in the first mounting hole of the bumper by the Snap-On action while utilizing the elasticity and elastic restoring force of the pair of elastic pieces, and the spoiler can be simply temporarily fixed to the bumper.

According to another aspect of the invention, the common mounting section include a core material; the core material is higher in rigidity and lower in thermal expansion than materials forming the mounting base section and the main body section; and the core material is integrally embedded in the common mounting section. Due to the above structure, the long spoiler can be stably kept in a straight-line profile, and expansion (thermal expansion and shrinkage) of the spoiler caused by a change in temperature can be suppressed.

According to another aspect of the invention, the mounting base section has an elastic lip rising in an obliquely forward direction; and the elastic lip is elastically deformed coming into contact with an inner wall face of the mounting groove while the bumper spoiler is mounted on the bumper. Due to the above structure, by an elastic force of the elastic lip which is going to return to the initial profile in the mounting groove of the bumper, the spoiler can be firmly mounted on the bumper without causing any rattling.

According to another aspect of the invention, the main body section includes a shield piece, the shield piece being into elastic contact with a surface of the bumper. Due to the above structure, when a vehicle is traveling, on the bumper of which the spoiler is mounted, there is no possibility that no wind is admitted to enter between the bumper surface and the spoiler. Therefore, no turbulence is caused in this portion, and the wind can be effectively made to flow to the downstream.

According to another aspect of the invention, a plurality of stripes are formed on a lower end of a front side of the main body section, the stripes formed in the width direction of the main body section. There is a possibility that a lower portion of the spoiler located on the front face of a vehicle comes into contact with a road face or a protrusion on the road face while the vehicle is traveling. Even if the spoiler comes into contact with the protrusion and scratches are caused on the spoiler, since stripes are previously formed on the spoiler in the same direction as that of the scratches, no scratches stand out from the stripes. Therefore, it is possible to prevent the decoration from deteriorating.

According to another aspect of the invention, the main body section is made of a soft thermoplastic olefin elastomer having high elasticity; the mounting base section is made of harder polypropylene resin or harder thermoplastic olefin elastomer than the main body section capable of being elastically deformed; and the main body section and the mounting base section are melted and integrated via a junction section.

In this aspect of the invention, the weight of a spoiler can be effectively reduced because specific gravity of olefin resin is lower than that of most of other resins. The resin of the main body section and that of the mounting base section composing the spoiler have the same or similar solubility parameter. Therefore, both the main body section and the mounting base section are dissolved and welded to each other, and they are not separate from each other while the spoiler is being used. Further, even when the spoiler is disused and disposed, it is possible to incinerate the spoiler, and no toxic gas is generated in the process of incineration, which is unlike the incineration of vinyl chloride resin.

DETAILED DESCRIPTION OF THE PREFERRED EMBODIMENTS

Figure 1:
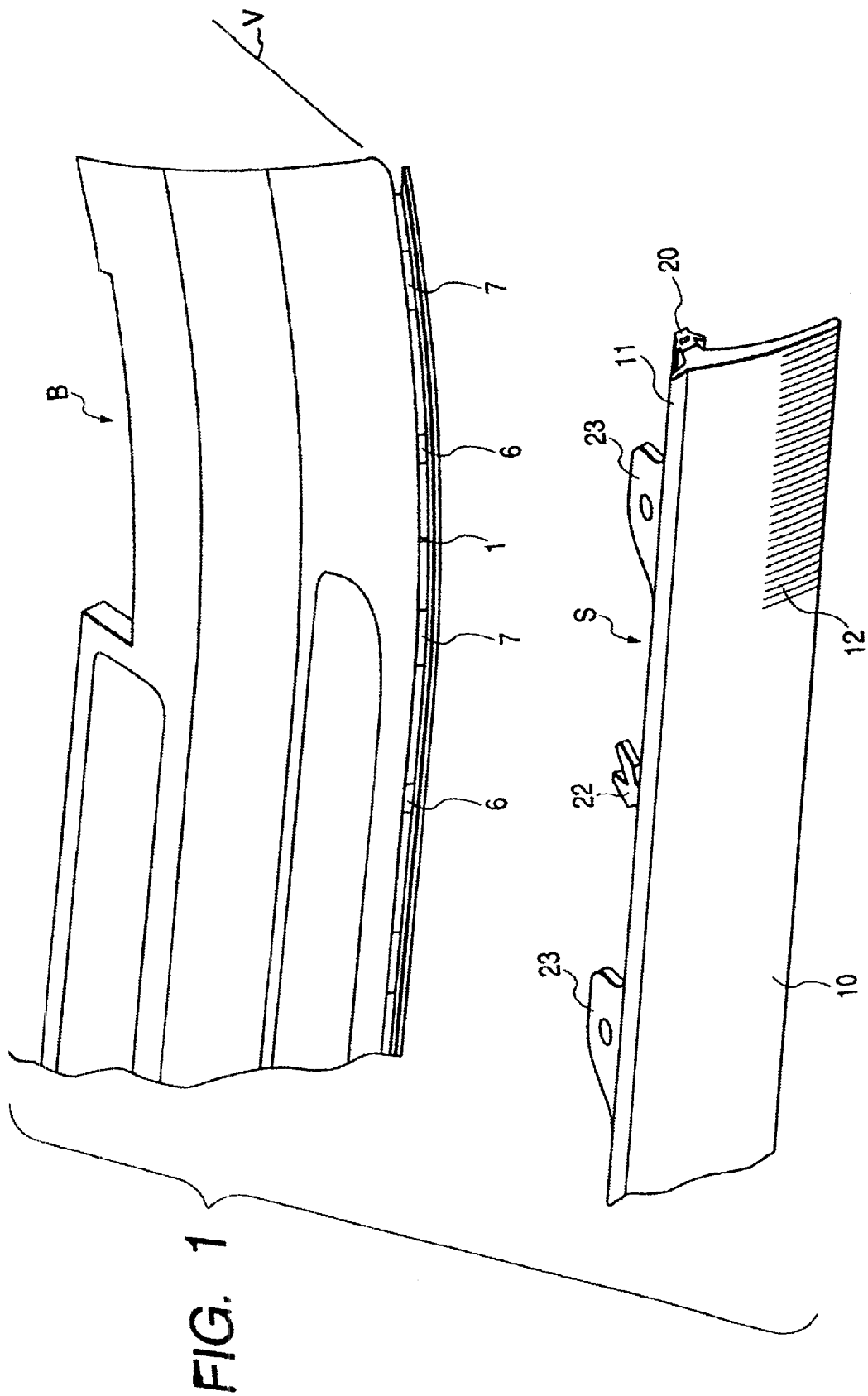
FIG. 1 is a partial perspective view showing a bumper spoiler of the present invention and a front bumper on a vehicle on which the bumper spoiler is to be mounted.
Figure 2:
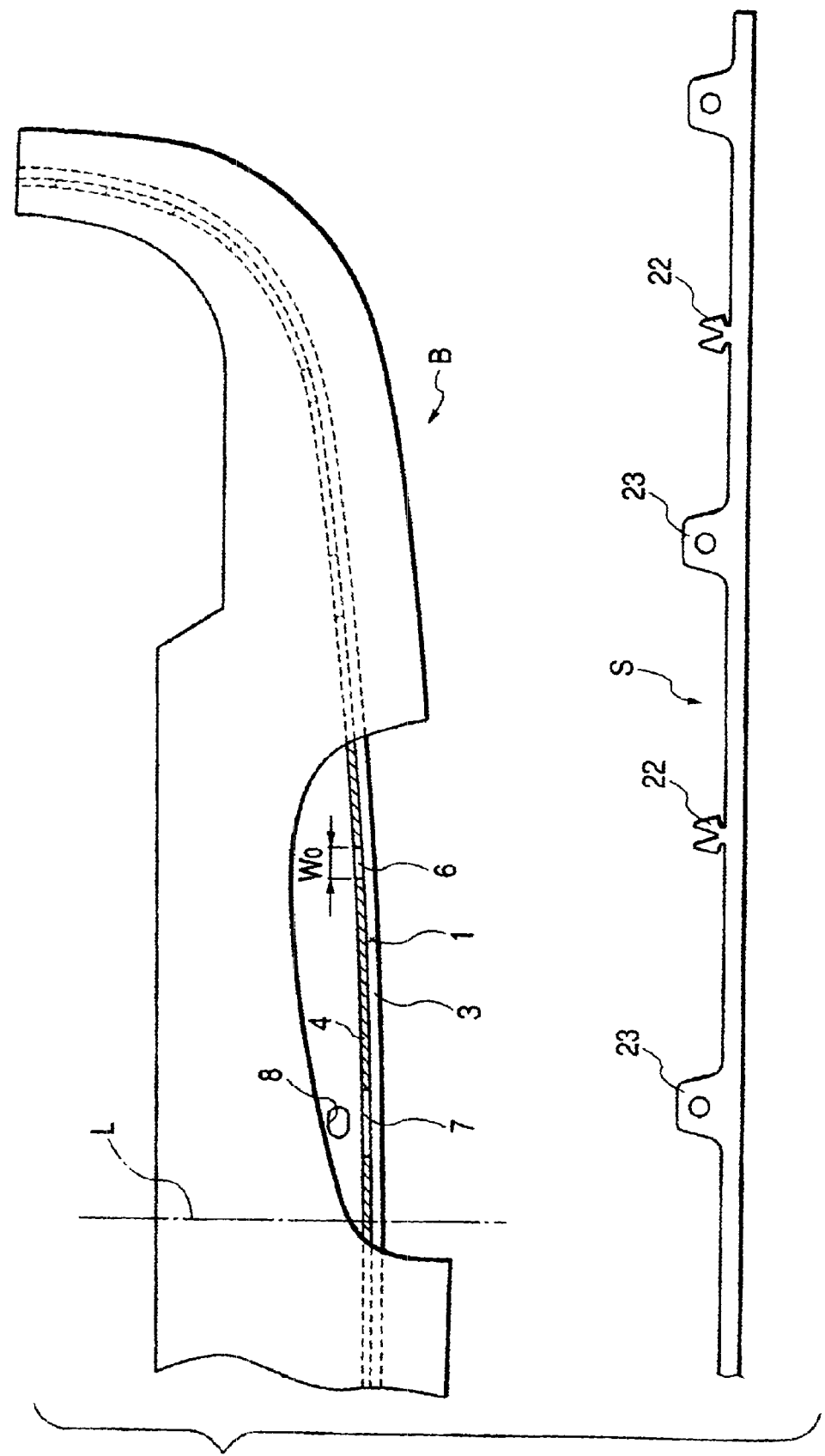
FIG. 2 is a plan view showing bumper spoiler of the present invention and front bumper on which bumper spoiler S is to be mounted.
Figure 3:
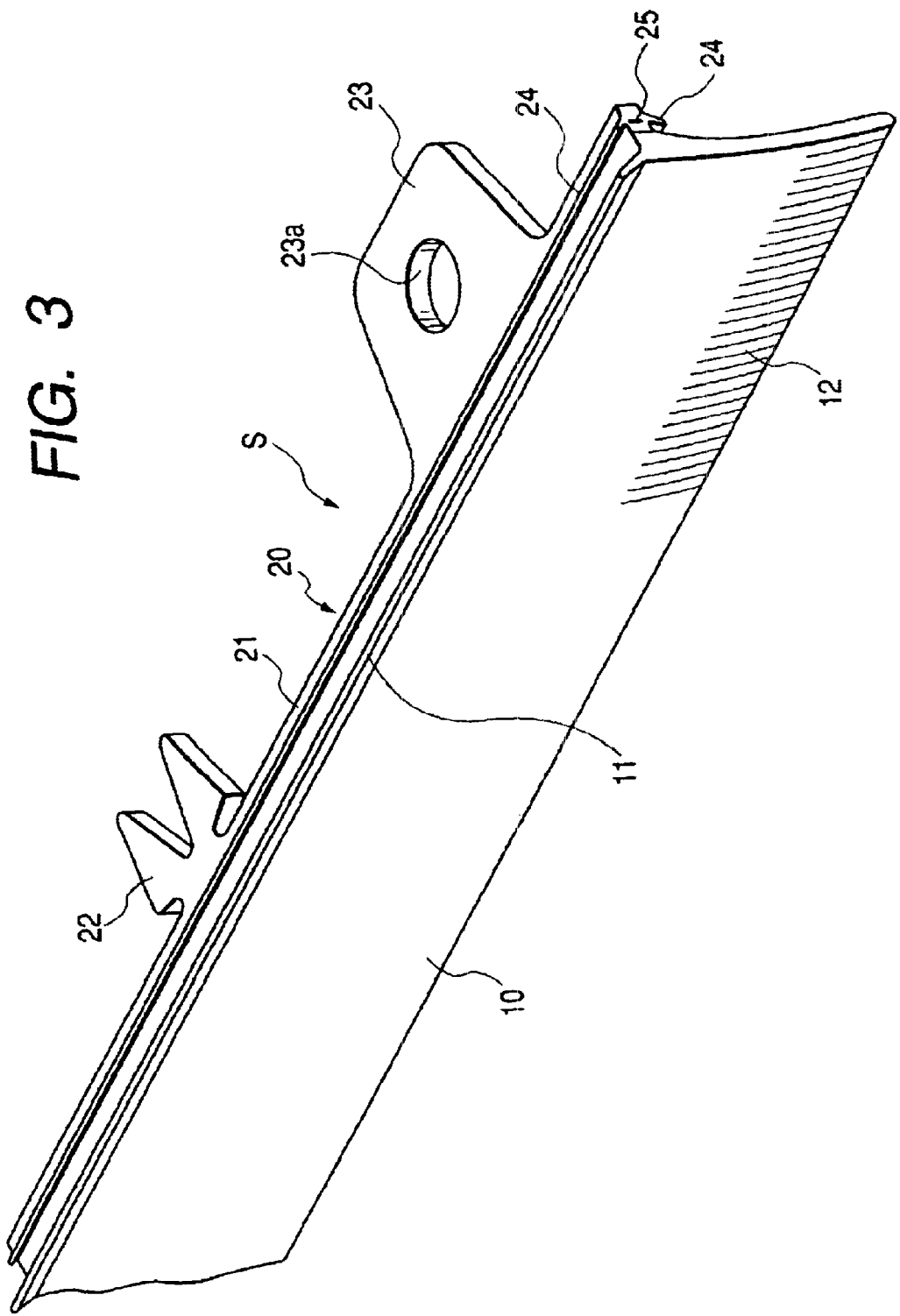
FIG. 3 is a perspective view showing bumper spoiler formed by removing an unnecessary portion from the mounting base section of spoiler.
Figure 4:
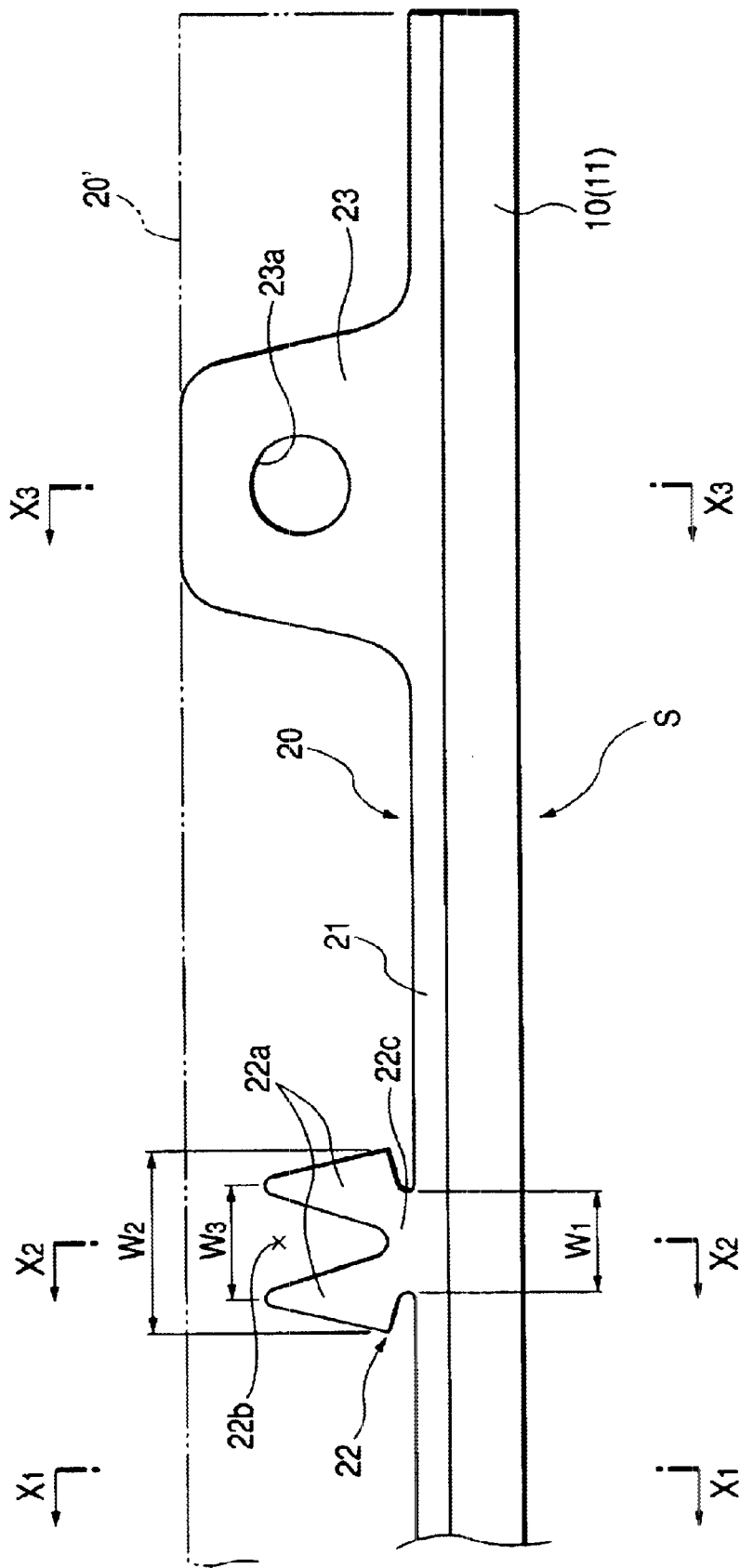
FIG. 4 is a plan view showing bumper spoiler formed by removing an unnecessary portion from the mounting base section of spoiler.
Figure 5:
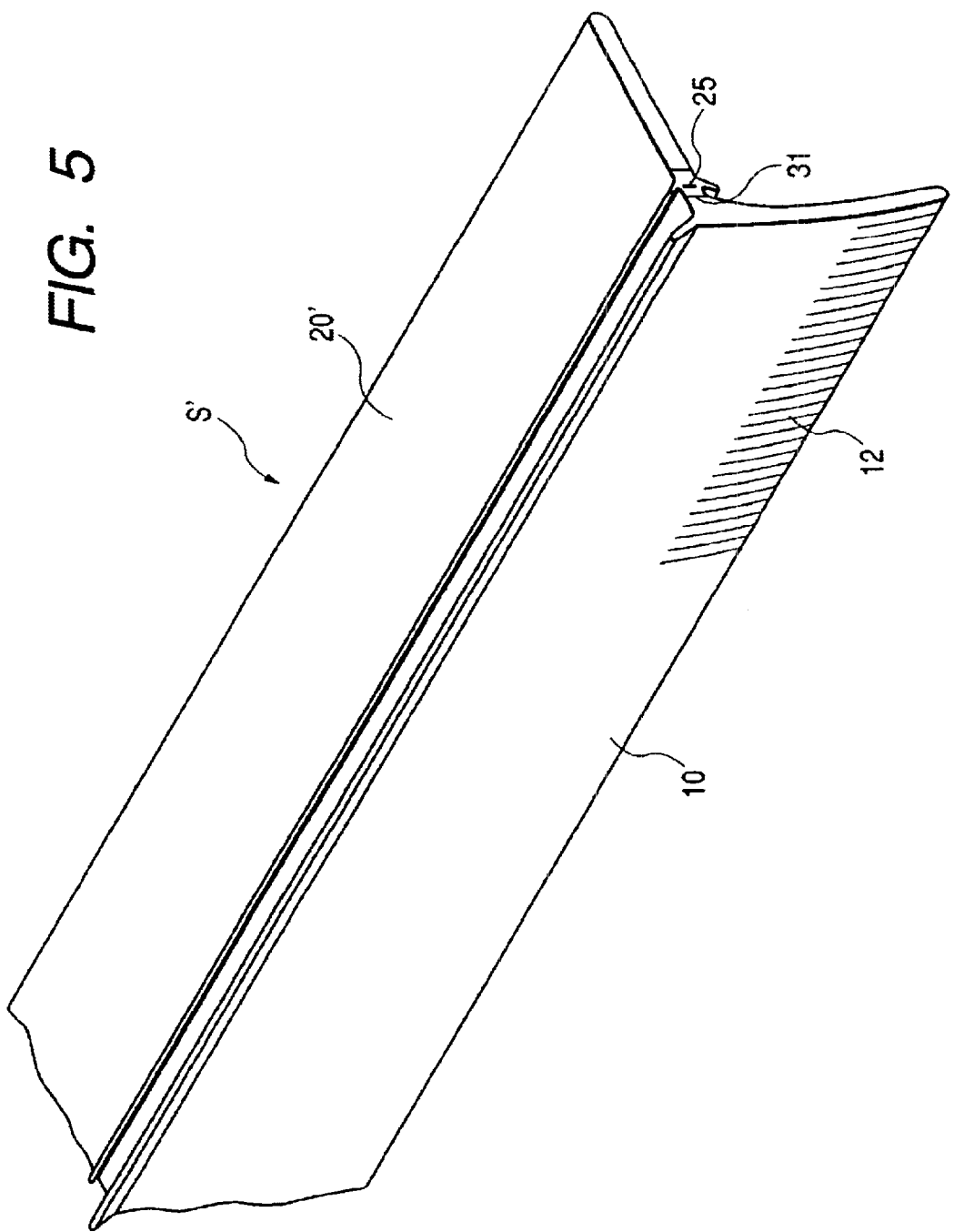
FIG. 5 is a partial perspective view of bumper spoiler which is in the middle of a manufacturing process.

Referring to a plurality of embodiments, the present invention will be further explained in detail as follows. FIG. 1 is a partial perspective view of a bumper spoiler S of the present invention and a front bumper B on a vehicle V on which the bumper spoiler S is mounted. FIG. 2 is a plan view of the bumper spoiler S and the front bumper B. FIG. 3 is a perspective view of the bumper spoiler S formed by removing an unnecessary portion from a mounting base section 20 of a bumper spoiler 5, which is in the middle of the manufacturing process. FIG. 4 is a plan view of the bumper spoiler 5, which is illustrated in FIG. 3. FIG. 5 is a partial perspective view of the bumper spoiler S' which is in the middle of the manufacturing process. First, the bumper spoiler S will be explained about the relation of the bumper spoiler S with a mounting section on front bumper B. After that, the mounting structure of spoiler S on the front bumper B will be explained.

As shown in FIGS. 1 to 4, the spoiler S is long and symmetrical with respect to a centerline L in the width direction on a front face. The spoiler S includes: a belt-shaped spoiler body section 10 which is arranged in the substantially vertical direction when it is mounted on bumper B; and a substantially sheet-shaped mounting base section 20 protruding outward from a reverse face of an upper end portion of the spoiler body section 10. The spoiler body section 10 is molded out of an elastic synthetic resin including thermoplastic elastomer (hereinafter TPE) which is softer than the mounting base section 20 (described later). For example, the spoiler body section 10 is molded out of soft TPE resin (It is preferable that Durometer Hardness HDA is not more that 70°.). The mounting base section 20 is molded out of an elastic rigid synthetic resin including thermoplastic elastomer which is harder than the main body section 10. For example, the mounting base section 20 is molded out of polypropylene (hereinafter PP) resin or hard TPE resin (It is preferable that Durometer Hardness HDD is not less than 50°.). It is preferable that the junction section 31 (shown in FIG. 6) of both sections is welded and integrated in the process of co-extrusion molding so that the junction strength is enhanced. Material of the above TPE is not particularly limited. For example, it is possible to apply vinyl TPE, olefin TPE which will be referred to as "TPO" hereinafter, and styrene TPE. However, from the viewpoint of reducing the weight and preserving the environment, it is preferable to use TPO. When the main body section 10 and the mounting base section 20 of the spoiler S are respectively molded out of TPO, the following advantages can be provided: in the case where the spoiler S is disused and disposed, it is possible to incinerate them and no toxic gas is generated. Except for TPE, it is preferable to use soft EPDM for the main body section 10. Also it is preferable to use hard EPDM for the mounting base section 20.

More specifically, TPO material made by Mitsui Chemicals, Inc. and sold with a trade name MILASTOMER is preferably used as the material for forming the main body section 10. A mixture of MILASTOMER TPO and polypropylene (PP) is preferably used as the material for forming the mounting base section 20. Other than the above-mentioned materials, TPO material sold by Advanced Elastomer Systems Japan Ltd. with a trade name SANTOPRENE may be used.

Figure 6:
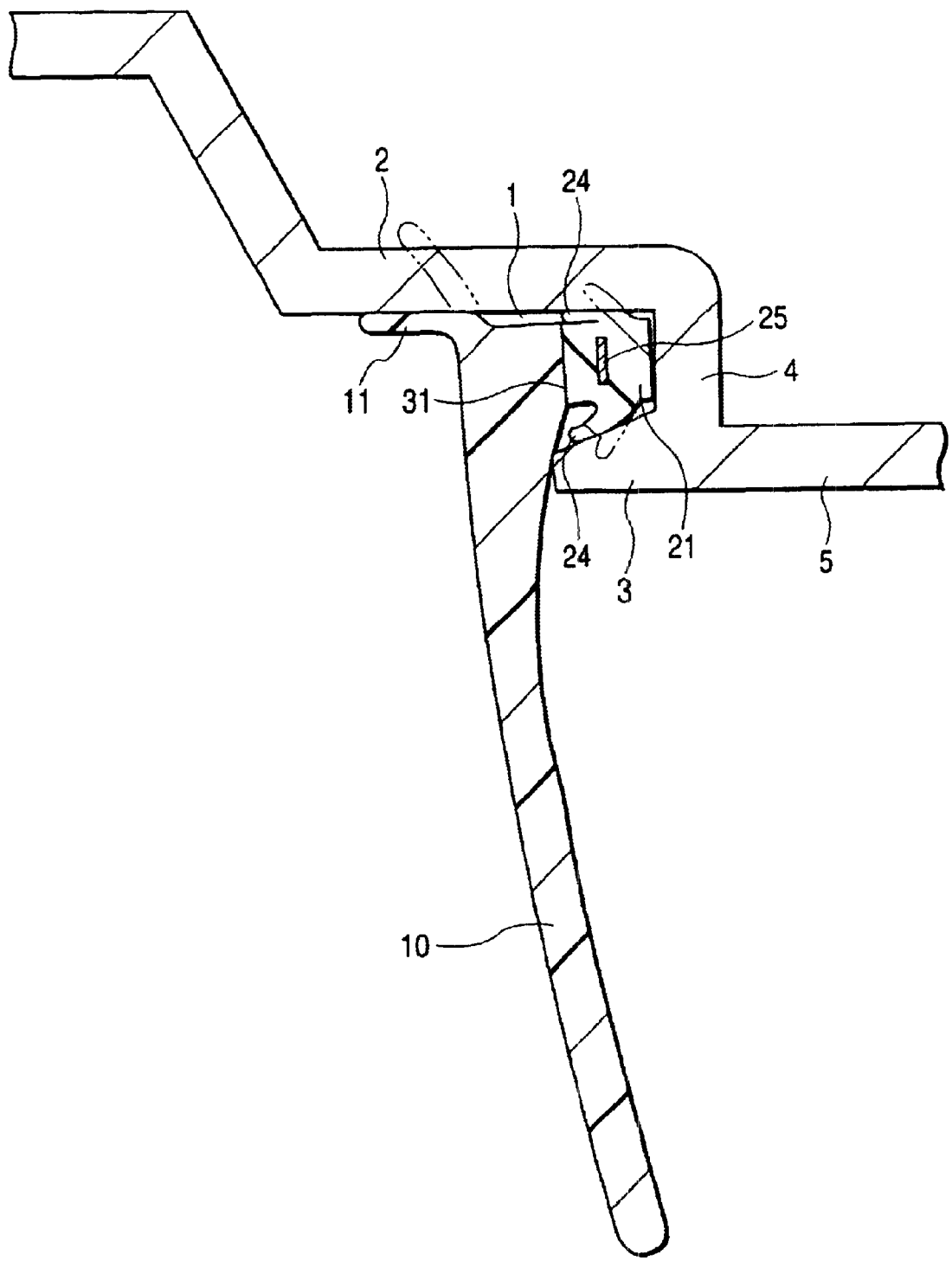
FIG. 6 is an enlarged sectional view taken on line $X_1$—$X_1$ in FIG. 4 in a state in which bumper spoiler is mounted on front bumper.
Figure 7:
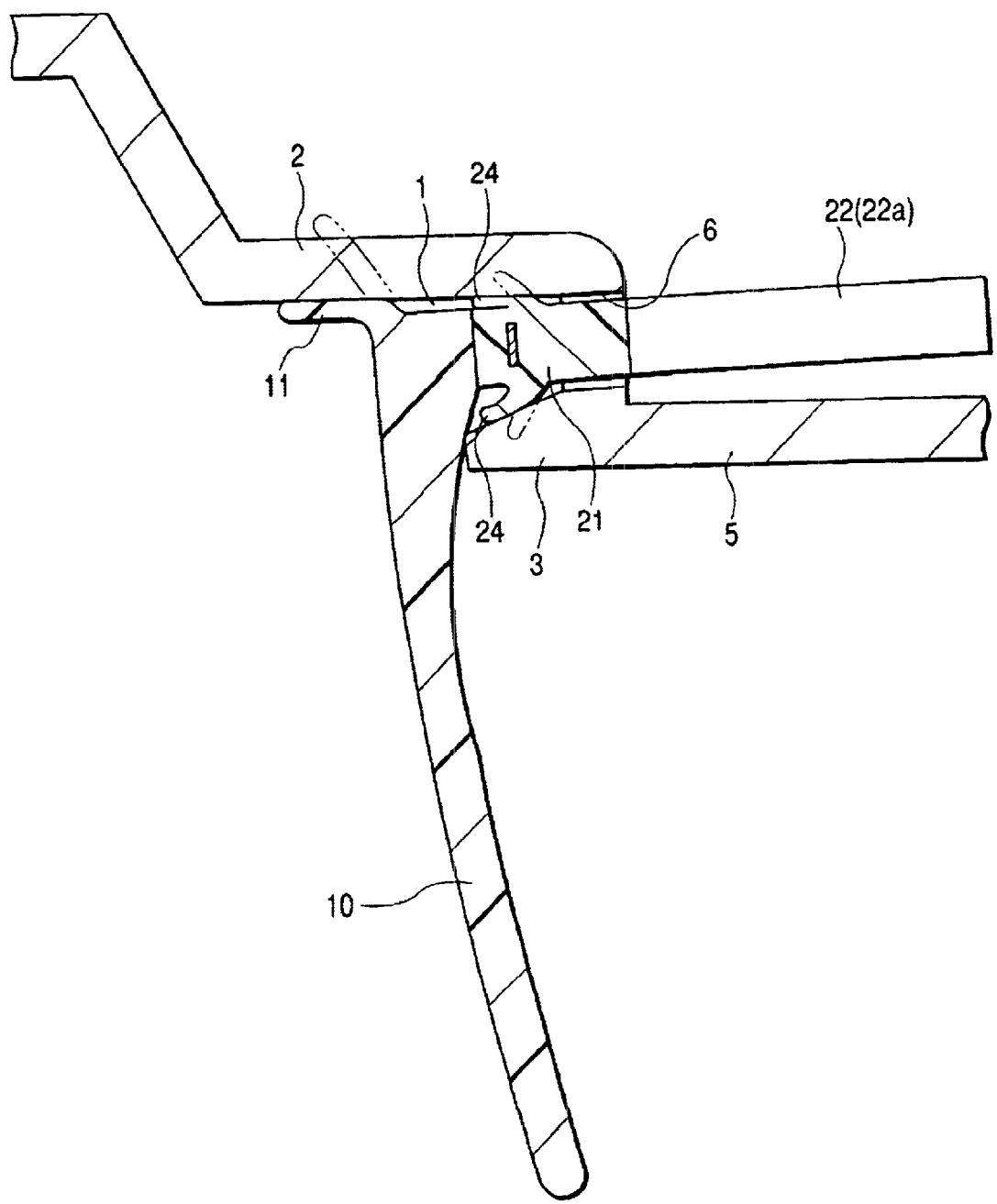
FIG. 7 is an enlarged sectional view taken on line $X_2$—$X_2$ in FIG. 4 in the same state.
Figure 8:
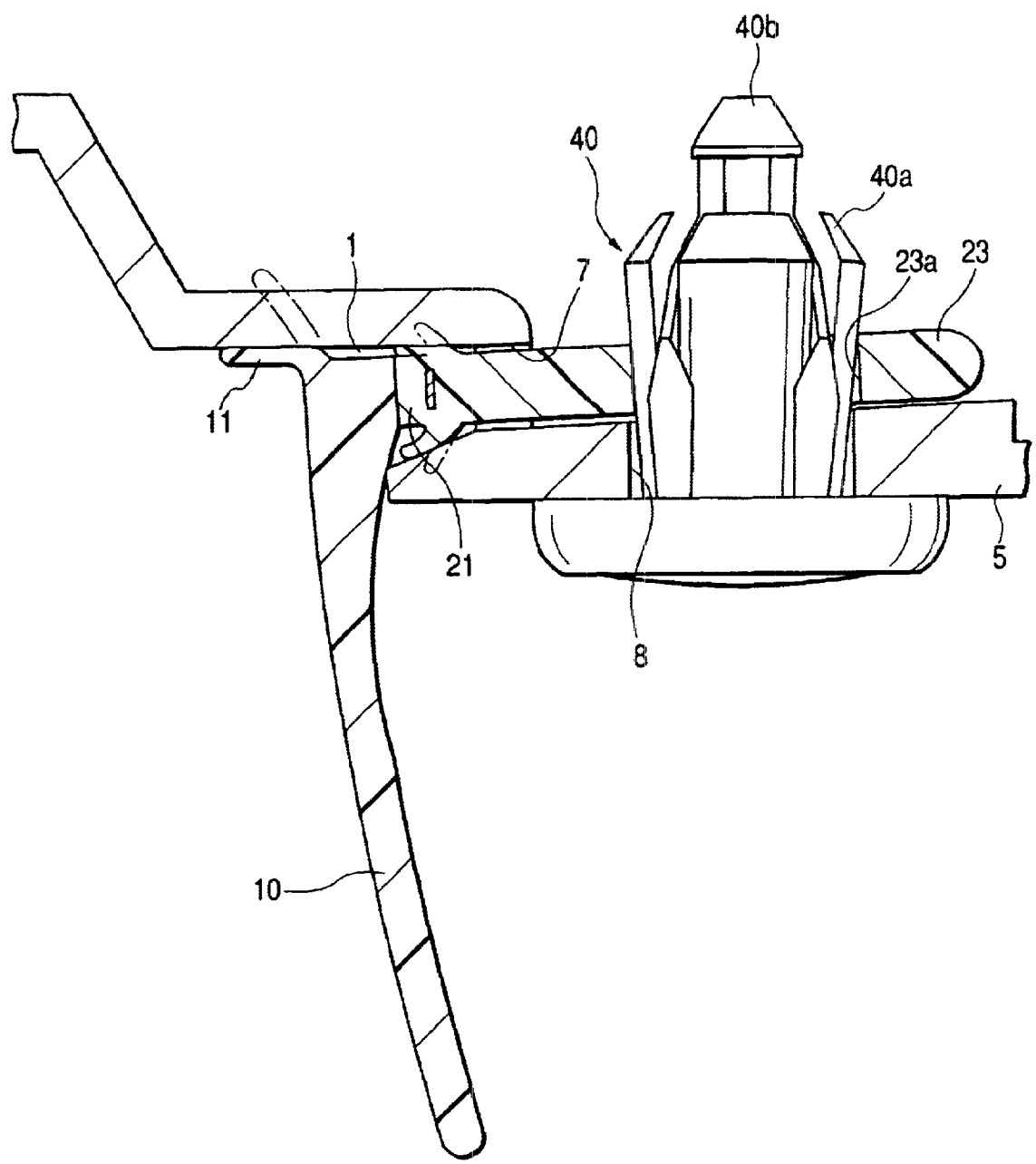
FIG. 8 is an enlarged sectional view taken on line $X_3$—$X_3$ in FIG. 4 in the same state.

The mounting base section 20 includes: a common mounting section 21 which is provided all over the length and engaged in a spoiler mounting groove 1 (shown in FIG. 1 and FIGS. 6 to 8) of the front bumper B; and a first mounting section 22 and a second mounting section 23 which are formed integrally with the common mounting section 21 so that the first mounting section 22 and the second mounting section 23 are protruded toward the reverse side and alternately arranged in the longitudinal direction. As shown in FIGS. 6 to 8, the spoiler mounting groove 1 of bumper B is composed of three wall sections including: a groove upper wall section 2; a groove lower wall section 3; and a groove bottom wall section 4 so that a front portion of the spoiler mounting groove 1 is open. The groove lower wall section 3 is continuously integrated with a bottom wall section 5 which extends toward a rear direction of a vehicle. In the groove bottom wall section 4 forming the spoiler mounting groove 1, the first mounting hole 6 and the second mounting hole 7, to be respectively inserted into the first mounting section 22 and the second mounting section 23 each composing the mounting base section 20 of the spoiler S, are respectively arranged in a longitudinal direction (the width direction with respect to the vehicle) at the same or a predetermined interval as that of the first mounting section 22 and the second mounting section 23. In addition, in the case where bumper B extends to a side section of the vehicle via a corner section thereof, the first mounting hole 6 and the second mounting hole 7 are arranged in the side section at an interval in the longitudinal direction of the vehicle.

Figure 9:
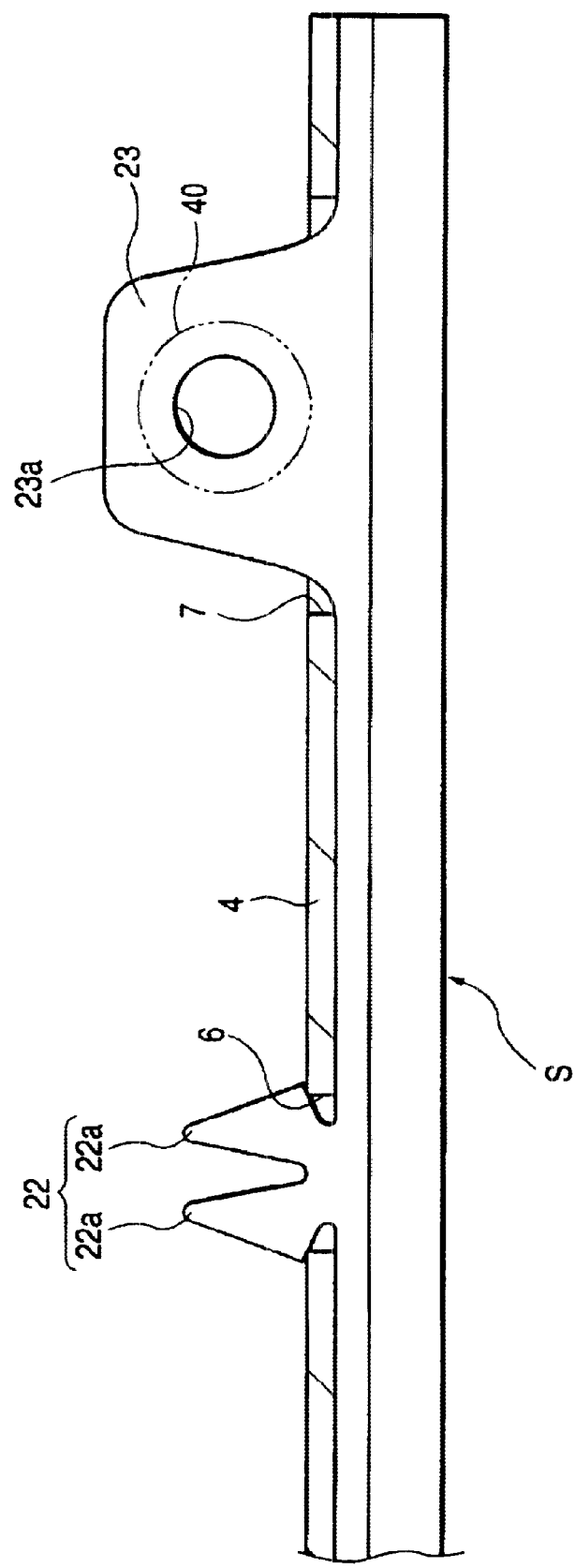
FIG. 9 is a partial longitudinal sectional view in the same state.

As shown in FIG. 4, the first mounting section 22 arranged in the mounting base section 20 of the spoiler S is composed of a pair of elastic pieces 22a capable of closing to and leaving from each other by the elastic deformation of spoiler S in the longitudinal direction. Between the pair of elastic pieces 22a, the deformation admitting space portion 22b is formed so that the pair of elastic pieces 22a can be elastically deformed. A width $W_1$ of the root portion 22c of the first mounting section 22 is slightly smaller than a width $W_0$ (shown in FIG. 2) of the first mounting hole 6 of bumper B. A maximum width $W_2$ of an intermediate portion of the pair of elastic pieces 22a is larger than a width $W_0$ of the first mounting hole 6. Further, a width $W_3$ between tip end portions of the pair of elastic pieces 22a is identical with the width $W_0$ (shown in FIG. 2) of the first mounting hole 6 or smaller than that. This first mounting section 22 is inserted into the first mounting hole 6 of bumper B as shown in FIG. 9 so that the base end sections of the pair of elastic pieces 22a are elastically engaged with a reverse side of an edge of the first mounting hole 6, whereby the spoiler S is temporarily mounted on the bumper B.

The second mounting section 23 is formed into what is called a tongue-shape in which the width of the second mounting section 23 is gradually reduced from its base or root end to its tip end. An expanding shaft section 40a of the clip 40 (described later) is inserted into the center of the second mounting section 23. The center of the second mounting section 23 is provided with a circular clip insertion hole 23a for pressing an outer periphery of the expanding shaft section 40a when the diameter of the expanding shaft section 40a is expanded, thereby to fix the expanding shaft section 40a. The tongue-shaped second mounting section 23 is used for finally fixing the bumper B to the spoiler S via the clip 40.

On the upper hand and the lower face of the common mounting section 21 composing the mounting base section 20 of spoiler S, elastic lips 24 are provided which come into elastic contact with the opposed inner wall faces when the common mounting section 21 is inserted into the spoiler mounting groove 1 of bumper B. These elastic lips 24 are integrally formed with the common mounting section 21 being inclined forward. Further, the tape-shaped core material 25 for preventing the expansion and shrinkage of the common mounting section 21 caused by a change in the temperature is integrally embedded in the common mounting section 21 all over the length. It is preferable that the core material 25 is made of material higher in rigidity and smaller in elongation than the materials of the spoiler body section 10 and the mounting base section 20, such as a steel strip (metal strip) or the like.

The front side of the spoiler body section 10 is slightly curved forming a convex profile. The upper end portion of the spoiler body section 10, positioning in the front side of the mounting base section 20, is integrated with the shield piece 11 which is obliquely directed upward to elastically come into contact with a lower face of the groove upper wall section 2 of bumper B. In a portion on the front side of the spoiler body section 10 from the lower end to the substantial center of spoiler S under the condition that spoiler S is mounted on bumper B, a large number of stripes 12 are formed in the width direction (the vertical direction when spoiler S is mounted on bumper B) all over the length. The reason why these stripes (shown in FIGS. 1 and 3) are provided is described as follows. There is a possibility that a lower portion of the spoiler body section 10 comes into contact with a road surface or protrusion on the road surface when a vehicle is traveling. Even when the spoiler body section 10 comes into contact with the protrusion and scratches are caused on the spoiler, the scratches do not stand out from the stripes 12 since stripes are previously formed on the spoiler in the same direction as that of the scratches caused on the spoiler body section 10. Therefore, it is possible to prevent the decoration of spoiler S from deteriorating.

Next, a method of manufacturing the above-mentioned spoiler S will be briefly explained below. First, the spoiler S' shown in FIG. 5, which is in the middle of the manufacturing process, is continuously formed by extrusion molding. This spoiler S', which is in the middle of the manufacturing process, includes: a substantially belt-shaped spoiler body section 10, the shape of which is the same as that of a product of the spoiler; and a sheet-shaped predetermined mounting base section 20' to be stamped which is integrally formed with the reverse side of the upper portion of the spoiler body section 10. The spoiler body section 10 and the mounting base section 20', each made of the above-mentioned different resins, are simultaneously molded by compound extrusion molding (also referred to as "co-extrusion"). Since these resins have the same or similar solubility parameter and the junction section 31 is molded by welding and integrating the spoiler body section 10 and the predetermined mounting base section 20' the bonding strength of the junction section 31 of both resins is enhanced through the process of extrusion. In addition, the extrusion is executed in a manner that the core material 25 is embedded all over the length in a portion of the predetermined mounting base section 20' close to the spoiler body section 10.

At a lower end portion of the spoiler S', which is in the middle of the manufacturing process, on the surface side, a large number of stripes 12 are formed all over the length simultaneously with extrusion. These stripes 12 can be formed by the following method: immediately after the extrusion die, a transfer roller having fine protrusions and recesses on the overall periphery thereof is arranged; and then the transfer roller is press-contacted with the spoiler body section 10 of the spoiler S', which is in the middle of the manufacturing process, while the transfer roller is being rotated. In this way, the stripes 12 can be easily formed.

Next, the predetermined mounting base section 20' of the spoiler S', which is in the middle of the manufacturing process and is cut into a predetermined length, and then is blanked (stamped out) into a predetermined shape. The first mounting section 22 and the second mounting section 23 are formed by a residual portion which has been left after blanking. As shown in FIG. 4, the shape of the blanking is as follows. In the mounting base section 20, a portion close to the spoiler body 10 and having a predetermined width is left all over the length so as to constitute the common mounting section 21 with the core material 25 embedded. Another portion, continuously integrated with the common mounting section 21 and extending therefrom in the rear direction, is left as the first mounting section 22 and the second mounting section 23 which are arranged in the longitudinal direction of the spoiler body section 10 at a predetermined interval and protrude in the rear direction.

This common mounting section 21 extends continuously in the longitudinal direction of spoiler S. In the common mounting section 21, the core material 25 is embedded. The core material 25 is composed of a steel strip or the like so that its expansion property is lower than that of the spoiler body section 10 and the mounting base section 20. In this embodiment, the strip-shaped core material 25 is integrally embedded in the common mounting section 21 so that the surface of the strip-shape is substantially parallel with the spoiler body section 10. Therefore, the core material 25 is allowed to bend in a direction perpendicular to the surface of the core material 25. (That is, the core material 25 is allowed to bend in the horizontal plane when spoiler S is mounted on the bumper B.) However, the core material 25 is not allowed to bend in a direction of its width. (That is, the core material 25 is not allowed to bend on the vertical plane when the spoiler S is mounted on the bumper B.) Therefore, when the spoiler S is mounted on bumper B, the spoiler S can be bent along the shape of bumper B in the horizontal plane. However, the spoiler S is so constructed that it is difficult to bend it in the vertical plane. Due to the above structure, even if bumper B includes corners of a small radius of curvature at both side sections, the spoiler S can be mounted on bumper B while it follows the curved corners well.

Next, explanations will be made into how to mount spoiler S on front bumper B. The common mounting section 21 provided in the mounting base section 20 of spoiler S all over the length is inserted into the spoiler mounting groove 1 of bumper B. Then the first mounting sections 22, which are integral with the mounting base section 20 and are arranged at given intervals in the longitudinal direction of the mounting base section 20, are inserted into the first mounting holes 6 formed in the groove bottom wall section 4 of the spoiler mounting groove 1. Then, a pair of elastic pieces 22a constituting the first mounting section 22 are elastically deformed and come close to each other so that the distance therebetween is reduced. When the pair of elastic pieces 22a pass through the first mounting hole 6, the elastic pieces 22a return to the initial shape. Due to this, the first mounting section 22 of spoiler S is elastically engaged in the first mounting hole 6 of bumper B as shown in FIG. 9, and spoiler S is temporarily fixed to the bumper B.

In the curved portions of both corners of the bumper B, while the spoiler S is being bent in the horizontal plane along the curved portions, the first mounting sections 22 of spoiler S are inserted into and engaged in the first-mounting holes 6 of the bumper B. Due to this, the spoiler S is temporarily fixed to the bumper B all over the length slightly curving along the plane shape of the bumper B. When spoiler S is temporarily fixed to the bumper B in this way, the tongue-shaped second mounting sections 23 of spoiler S are inserted into the second mounting holes 7 formed in the groove bottom wall section 4 of the bumper B. In the above condition, the tongue-shaped second mounting sections 23 of the spoiler S are simply inserted into the second mounting holes 7 formed in the groove bottom wall section 4 of the bumper B, but not still engaged with the bumper B (as shown in FIG. 9).

In the final process, the spoiler S is finally fixed to the bumper B by using the clips 40. As shown in FIG. 8, in the second mounting section 23 of the spoiler S in the bottom wall section 5 of the bumper B, the clip insertion slot 8 (as shown in FIGS. 2 and 8) which is long in the vehicle width direction is formed. Therefore, when the common mounting section 21 of the spoiler S is inserted into the spoiler mounting groove 1 of the bumper B, the clip insertion hole 23a formed in the second mounting section 23 of the spoiler S is disposed in any portion of the clip insertion slot 8 formed in the bumper B. In this condition, the expanding shaft section 40a of clip 40 is inserted into both the clip insertion slot 8 and the clip insertion hole 23a from the lower side of the clip insertion slot 8. After that, when the expanding pin 40b inserted into the center of the clip 40 is strongly pushed upward, the diameter of the expanding shaft section 40a is expanded and the outer periphery of the expanding shaft section 40a is pushed and fixed to the inner periphery of the clip insertion hole 23a. Therefore, in the second mounting section 23 of the spoiler S, the spoiler S is finally fixed to bumper B. In this way, the spoiler S is completely mounted on bumper B.

Under the condition that the spoiler S is finally fixed to bumper B, the shield piece 11, which is integrally formed at an upper end of the spoiler body section 10 and protrude in the front oblique direction, is elastically bent and tightly contacted with the groove upper wall section 2. Due to the foregoing, it is possible to effectively prevent air from getting into a portion between the groove upper wall section 2 of the spoiler mounting groove 1 and spoiler S. The elastic lips 24, which are integrally molded on an upper and a lower face of the common mounting section 21, respectively come into elastic contact with the opposed faces of the groove upper wall section 2 and the groove lower wall section 3 forming the spoiler mounting groove 1. Therefore, a gap formed between the spoiler mounting groove 1 and the common mounting section 21 inserted thereinto is blocked, and the spoiler S can be firmly mounted on the bumper B without causing any rattle by an elastic restitution force of the elastic lips 24 in the spoiler mounting groove 1.

In the above embodiment, the clip 40 has the construction that the expanding shaft section 40a expands when the expanding pin 40b is pushed into the expanding shaft section 40a. However, the structure of the clip is not limited to the above specific embodiment. Further, in the above embodiment, the elastic lips 24 are respectively arranged on both the upper and the lower side of the common mounting section 21 of spoiler S, however, this elastic lip 24 may be disposed only on one of the upper and the lower side.

According to the present invention, due to the above mounting structure, the spoiler is firmly mounted on the bumper. Therefore, even when the spoiler is given air resistance and vibration while the vehicle is traveling, the spoiler is not shifted from a predetermined position at which the spoiler is mounted. Since the spoiler is mounted on the bumper, a wind blowing against the bumper while the vehicle is traveling can be effectively made to flow downward, so that air resistance can be reduced and fuel consumption of the vehicle can be enhanced. Further, since the main body of the spoiler is made of soft and elastic material, even when a portion of the spoiler comes into contact with a road face, no damage is caused in the spoiler.

What is claimed is:

1. A device for reducing air resistance of a vehicle, comprising:
   a front bumper of the vehicle having a first mounting hole and a second mounting hole;
   a bumper spoiler to be mounted on the front bumper; and
   a mounting piece for fixing the bumper spoiler to the front bumper; wherein
   the bumper spoiler comprises a main body section and a mounting base section, the mounting base section protruding from a reverse side of the main body section;
   the main body section is made of elastic material;
   the mounting base section is made of rigid material harder than the main body section, the rigid material capable of being elastically deformed;
   the main body section and the mounting base section are integrally joined to each other;
   the mounting base section has a first mounting section and a second mounting section;
   the first mounting section is inserted into and elastically engaged with the first mounting hole, thereby being temporarily fixed to the front bumper; and
   the second mounting section is inserted into the second mounting hole so that the second mounting section is finally fixed to the front bumper by the mounting piece.

2. The device for reducing air resistance of a vehicle according to claim 1, wherein
   the first and the second mounting section are disposed at a predetermined interval in a longitudinal direction of the bumper spoiler.

3. The device for reducing air resistance of a vehicle according to claim 1, wherein
   the first and the second mounting section are formed as residual portions which are left when the mounting base section is partially removed.

4. The device for reducing air resistance of a vehicle according to claim 1, wherein
   the front bumper has a mounting groove; and
   the mounting base section has a common mounting section continuously formed along the main body section, the common mounting section to be engaged with the mounting groove.

5. The device for reducing air resistance of a vehicle according to claim 4, wherein
   the first and the second mounting section are formed as residual portions which are left when a distal edge of the mounting base section is partially removed.

6. The device for reducing air resistance of a vehicle according to claim 1,
   wherein the first mounting section includes a pair of elastic pieces both mutually separated and capable of elastically deforming;
   each said elastic piece has a tip end portion, intermediate portion and root portion;
   a distance between the intermediate portions of the pair of elastic pieces exceeds the size of the first mounting hole before the pair of elastic pieces are inserted into the first mounting hole; and
   a width of the root portions of the first mounting section is smaller than the size of the first mounting hole.

7. The device for reducing air resistance of a vehicle according to claim 4, wherein
   the common mounting section includes a core material;
   the core material is higher in rigidity and lower in thermal expansion than the materials forming the mounting base section and the main body section; and
   the core material is integrally embedded in the common mounting section.

8. The device for reducing air resistance of a vehicle according to claim 1, wherein
   the front bumper has a mounting groove;
   the mounting base section has an elastic lip rising in an obliquely forward direction; and
   the elastic lip is elastically deformed coming into contact with an inner wall face of the mounting groove while the bumper spoiler is mounted on the front bumper.

9. The device for reducing air resistance of a vehicle according to claim 1, wherein
   the main body section includes a shield piece, the shield piece being in elastic contact with a surface of the front bumper.

10. The device for reducing air resistance of a vehicle according to claim 1, wherein a plurality of stripe marks are formed on a lower end of a front side of the main body section, the stripe marks formed in the vertical direction of the vehicle.

11. The device for reducing air resistance of a vehicle according to claim 1, wherein
    the main body section is made of a soft thermoplastic olefin elastomer having high elasticity;
    the mounting base section is made of hard polypropylene resin or thermoplastic olefin elastomer capable of being elastically deformed; and
    the main body section and the mounting base section are melted and integrated via a junction section.

12. The device for reducing air resistance of a vehicle according to claim 1,
    a mounting piece insertion hole is formed in the vicinity of the second mounting hole; and
    the mounting piece is inserted into the mounting piece insertion hole, thereby the second mounting section is finally fixed to the bumper.

13. A bumper spoiler to be mounted on a front bumper of a vehicle, comprising:
    a main body section made of elastic material; and
    a mounting base section protruding from a reverse side of the main body section, the mounting base section made of rigid material harder than the main body section and capable of being elastically deformed; wherein the main body section and the mounting base section are integrally joined to each other; and the mounting base section has a first mounting section and a second mounting section, the first mounting section to be inserted into and elastically engaged with a first mounting hole of the front bumper to be temporarily fixed thereto, the second mounting section to be inserted into a second mounting hole to be finally fixed to the front bumper by a mounting piece.

14. The bumper spoiler according to claim 13, wherein the first and the second mounting section are disposed at a predetermined interval in a longitudinal direction of the bumper spoiler.

15. The bumper spoiler according to claim 13, wherein the first and the second mounting section are formed as residual portions which are left when the mounting base section is partially removed.

16. The bumper spoiler according to claim 13, wherein the mounting base section has a common mounting section continuously formed along the main body section, the common mounting section to be engaged to a mounting groove of the front bumper.

17. The bumper spoiler according to claim 16, wherein the first and the second mounting section are formed as residual portions which are left when a distal edge of the mounting base section are partially removed.

18. The bumper spoiler according to claim 13, wherein the first mounting section includes a pair of elastic pieces both mutually separated and capable of elastically deforming;

each said elastic piece has a tip end portion, intermediate portion and root portion;

a distance between the intermediate portions of the pair of elastic pieces exceeds the size of the first mounting hole before the pair of elastic pieces are inserted into the first mounting hole; and a width of the root portions of the pair of elastic pieces is smaller than the size of the first mounting hole.

19. The bumper spoiler according to claim 16, wherein the common mounting section include a core material;

the core material is higher in rigidity and lower in thermal expansion than the materials forming the mounting base section and the main body section; and the core material is integrally embedded in the common mounting section.

20. The bumper spoiler according to claim 13, wherein the mounting base section has an elastic lip rising in an obliquely forward direction; and the elastic lip is elastically deformed coming into contact with an inner wall face of a mounting groove of the front bumper while the bumper spoiler is mounted on the front bumper.

21. The bumper spoiler according to claim 13, wherein the main body section includes a shield piece, the shield piece being in elastic contact with a surface of the front bumper.

22. The bumper spoiler according to claim 13, wherein a plurality of stripe marks are formed on a lower end of a front side of the main body section, the stripe marks formed in the vertical direction of the vehicle.

23. The bumper spoiler according to claim 13, wherein the main body section is made of a soft thermoplastic olefin elastomer having high elasticity;

the mounting base section is made of hard polypropylene resin or thermoplastic olefin elastomer capable of being elastically deformed; and the main body section and the mounting base section are melted and integrated via a junction section.

* * * * *